(12) United States Patent
Vai et al.

(10) Patent No.: US 11,601,034 B2
(45) Date of Patent: Mar. 7, 2023

(54) METHOD AND DEVICE FOR DEFORMING U-SHAPED ELECTRIC CONDUCTORS

(71) Applicant: Gehring e-tech GmbH, Ostfildern (DE)

(72) Inventors: Pier Vai, Pompiano (IT); Angiolino Benedetti, Nuvolento (IT); Crescini Silvano, Calvagese Della Riviera (IT)

(73) Assignee: Gehring e-tech GmbH, Ostfildern (DE)

(*) Notice: Subject to any disclaimer, the term of this patent is extended or adjusted under 35 U.S.C. 154(b) by 60 days.

(21) Appl. No.: 16/611,965

(22) PCT Filed: May 11, 2018

(86) PCT No.: PCT/EP2018/062243
§ 371 (c)(1),
(2) Date: Nov. 8, 2019

(87) PCT Pub. No.: WO2018/206783
PCT Pub. Date: Nov. 15, 2018

(65) Prior Publication Data
US 2021/0135552 A1     May 6, 2021

(30) Foreign Application Priority Data
May 11, 2017   (DE) .......................... 102017004538.0

(51) Int. Cl.
  *H02K 15/04*       (2006.01)
  *B23P 19/02*       (2006.01)
(52) U.S. Cl.
  CPC .......... *H02K 15/0421* (2013.01); *B23P 19/02* (2013.01)
(58) Field of Classification Search
  CPC ............................ H02K 15/0421; B23P 19/02
  See application file for complete search history.

(56) References Cited

U.S. PATENT DOCUMENTS 5,211,670 A    5/1993  Ohmi et al.
6,425,175 B1 *  7/2002  Sawada .............. H02K 15/0414
                                                29/564.1
(Continued)

FOREIGN PATENT DOCUMENTS

DE       47392 A3     4/1966
DE    10016151 A1    10/2000
(Continued)

OTHER PUBLICATIONS

International Preliminary Report on Patentability for PCT/EP2018/062243, pp. 1-5. Report completed Jul. 1, 2019.
(Continued)

*Primary Examiner* — Peter Dungba Vo
*Assistant Examiner* — Jose K Abraham (57) ABSTRACT

The invention relates to a method and a device for deforming a U-shaped electric conductor into a hairpin which can be used to produce a bar winding of an electric machine. Prior to the deforming process, the electric conductor has two parallel limbs which are integrally connected together by means of a connection limb, and the three limbs are arranged on an imaginary plane. According to the invention, the two parallel limbs are first clamped in a respective clamping device, the first limb together with the first clamping device is then held in place, the second limb is then moved away from the first limb on a circular path, thereby stretching the connection limb, and a deformation section of the electric conductor is simultaneously or subsequently moved on a guide surface of a twisting guide element, wherein the guide surface protrudes radially beyond the circular path.

19 Claims, 7 Drawing Sheets

(56) References Cited

U.S. PATENT DOCUMENTS

| | | | | |
|---|---|---|---|---|
| 6,882,076 | B2* | 4/2005 | Masegi | H02K 15/0037 310/201 |
| 7,923,884 | B2* | 4/2011 | Seguchi | H02K 15/0428 310/201 |
| 2005/0081365 | A1* | 4/2005 | Gorohata | H02K 15/0428 29/598 |
| 2006/0103255 | A1* | 5/2006 | Seguchi | H02K 15/0428 310/201 |
| 2009/0178270 | A1* | 7/2009 | Guercioni | H02K 15/0428 29/598 |
| 2009/0265914 | A1* | 10/2009 | Guercioni | H02K 15/064 29/596 |
| 2013/0104381 | A1* | 5/2013 | Guercioni | H02K 15/0081 29/559 |
| 2013/0118222 | A1* | 5/2013 | Guercioni | H02K 15/0428 72/299 |
| 2015/0022038 | A1* | 1/2015 | Guercioni | H02K 15/0428 310/201 |
| 2015/0207391 | A1* | 7/2015 | Yamada | H02K 15/085 29/825 |
| 2016/0181897 | A1* | 6/2016 | Borrmann | H02K 15/067 29/596 |
| 2017/0019003 | A1* | 1/2017 | Ponzio | H02K 15/0421 |
| 2018/0183307 | A1* | 6/2018 | Yamada | H02K 15/085 |

FOREIGN PATENT DOCUMENTS

| | | |
|---|---|---|
| DE | 10037239 A1 | 2/2001 |
| DE | 69816263 T2 | 5/2004 |
| DE | 60303535 T2 | 9/2006 |
| DE | 60210572 T2 | 3/2007 |
| DE | 60309539 T2 | 8/2007 |
| DE | 60218608 T2 | 11/2007 |
| DE | 102010016197 A1 | 4/2011 |
| DE | 102014226224 A1 | 6/2016 |
| EP | 02710715 B1 | 10/2003 |
| EP | 3142234 A1 | 3/2017 |
| JP | 2004297863 A * | 10/2004 |

OTHER PUBLICATIONS

EP Office Action, dated Apr. 26, 2021, pp. 1-5.
International Search Report and Written Opinion Form PCT/ISA/210 and PCT/ISA/237, pp. 1-7, International Filing Date May 11, 2018, dated Aug. 29, 2018.

* cited by examiner

METHOD AND DEVICE FOR DEFORMING U-SHAPED ELECTRIC CONDUCTORS

CROSS-REFERENCE TO RELATED APPLICATIONS

This is a National Stage Application, filed under 35 U.S.C. 371, of International Patent Application No. PCT/EP2018/062243, filed on May 11, 2018, which claims priority to German patent application No. 102017004538.0 filed on May 11, 2017, contents of both of which are incorporated herein by reference in their entireties.

BACKGROUND

The invention relates to a method and device for deforming a U-shaped electric conductor which is rectangular in cross section into a hairpin, which is used for the production of a bar winding of an electric machine, wherein before the deforming process the electric conductor has two mutually parallel limbs which are integrally connected to each other by means of a connection limb, and in which the three limbs are disposed in an imaginary, flat plane.

In the context of the invention, the term "electric machine" is understood to mean only electric motors and electric generators which convert electrical energy into mechanical energy or mechanical energy into electrical energy.

It is known from DD 47 392 B1 that so-called bar windings are used to produce the winding of high-performance electrical machines. These bar windings consist of a large number of solid bars of a highly electrically-conductive material. The bars are connected to each other after insertion thereof into the grooves of armature or stator cores in such a way that they form at least one winding strand depending on the design.

According to an embodiment known from GB 200,469 B, the bars used for the construction of a bar winding can have a substantially U-shaped geometry, in which two mutually parallel limbs are integrally connected to one another by means of a connection limb. The cross-sectional geometry of the limbs is rectangular. Such bars are also known as so-called hairpins. So that the two mutually parallel limbs of the U-shaped bars can be used in an armature or stator core in radially offset grooves, the U-shaped bars known from GB 200,469 B comprise an offset area in the area of the connection limbs of said bars, the U-shaped bar being twisted in said offset area, as will be explained with reference to an embodiment.

Moreover, it is known from EP 2 710 715 B1 that, in a conventional method for producing hairpins, the rod-shaped electric conductors initially receive their described basic U-shaped geometry through a first bending process. Subsequently, in a second deforming process, the top of such a conductor, i.e. the connection limb thereof, is formed in a molding press, wherein these two mutually parallel limbs are held in the orientation which is required for the subsequent placement thereof in associated slots in a core of a stator or armature of an electric machine. This production method is judged to be unfavorable because hairpins of only one geometry can be produced by such a method or in a production machine operating according to this method. If hairpins are to have a different geometry for the production of another, for example, larger stator or armature, the molds of such a machine must be exchanged for other, geometrically appropriate molding tools, which is expensive. In addition, it is judged disadvantageous that the electric conductor is subject to comparatively large mechanical stresses in such a deforming process in a mold, which can lead to damage to the electric conductor and/or insulation thereof. In order to avoid these disadvantages, EP 2 710 715 B1 proposes a device and a method for the production of hairpins for electrical machines, in which the use of molds is obviated in favor of other deforming tools and method steps which this author also considers unfavorable.

SUMMARY OF THE INVENTION

Against this background, the object of the invention is to provide a method and a device with which generic hairpins are cheaper to produce than before. In particular, the device should be constructed such that it can be operated manually in the simplest case, but which can also be operated automatically. In addition, the device should, without great conversion effort, be suitable for the production of hairpins of different sizes and geometry, so as to be able to produce electrical machines overall cheaper than before.

These objects are achieved by a method and a device having the features of the independent patent claims. Advantageous developments are defined in the respective associated dependent claims.

The invention was based on the finding that a twisted geometry of the connecting section of a U-shaped electric conductor, which ensures the installation of the same in a bar winding of a stator or armature of an electric machine, is thereby comparatively easy to produce by, in a preferably first step, first turning the two mutually parallel and clamped limbs of the U-shaped electric conductor proximate to the connection limb and together therewith approximately perpendicular to the imaginary flat plane spanning between the two parallel limbs, and then in a necessary second step one of the two mutually parallel limbs is turned away from the other limb which is held immovably, carrying the connection limb along therewith along a circular path. In order to achieve an optimal twisting geometry, in particular in the area of the connection limb, during this movement of the second limb of the electric conductor a section of the connection limb is guided on a geometrically specially-shaped surface of a twisting guide element. By way of this pivoting along a predetermined circular section and by way of the deformation of at least the connection limb by means of the twisting guide element, the two mutually parallel limbs are brought into the exact orientation and position necessary for the limbs to be disposed in associated grooves of a stator core or armature core. Here, the mechanical stress on the electric conductor is relatively low.

According to the independent method claim, the invention accordingly relates to a method for deforming a U-shaped and cross-sectionally rectangular electric conductor, the method being suitable for the production of a bar winding of an electric machine, wherein before the deforming process the electric conductor has two mutually parallel limbs which are integrally connected to each other by a connection limb and wherein the three limbs are disposed in an imaginary flat plane.

To solve the method-related task, it is provided that first the two mutually parallel limbs are each clamped in a respective clamping device, that then the first limb is held stationary together with the first clamping device, that then the second limb moves away from the first limb along a circular path, the connection limb being stretched in the process, and that simultaneously or subsequently a deforming section of the electric conductor is moved along a guide surface of a twisting guide element which projects radially beyond the circular path. The first clamping device and the twisting guide element are disposed in a fixed position relative to each other.

The guide surface is designed so that after completion of the deforming process, the hairpin has the desired form and the transitions between the various sections of the electric conductor are as round as possible and have the largest possible radii of curvature in order to minimize the local deformation of the wire and any protective varnish. The guide surface is usually a free-form surface.

The fact that the second limb of the electric conductor is moved in a circular path with respect to the first, stationary and immovably clamped limb, the second limb is rotated about the longitudinal axis thereof so that the wide and narrow sides of the two limbs are no longer aligned parallel to each other, for example in a cuboid cross-section of the two limbs. As a result, an orientation of the wide and narrow limb sides is achieved which is necessary to be able to introduce these two limbs into a respective groove of a stator or armature core, the grooves being formed offset from one another on a circular section of said respective core in both the circumferential direction and radially. The movement of the connection limb over the guide surface of said twisting guide element thus allows a targeted deforming of the connection limb. The respective geometric design of the guide surface of the twisting guide element and the radial disk arrangement and adjustment angle-related positioning thereof in the path of movement of the second limb or connection limb produce the desired deforming at the connection limb of the electric conductor, which also causes no stress cracks in the material of the electric conductor.

Since the clamping of the two limbs, which are initially parallel to each other, the movement of the second limb along a circular path and the radial disk and adjustment angle-related alignment of the twisting guide element are achieved preferably by means of actuators which can be controlled using a control device, very different, in terms of their dimensions and geometry, generic electric conductors, i.e. so-called hairpins, can be produced automatically and inexpensively without the changing of molds using the method according to the invention.

In most embodiments of the bending device according to the invention, the axis of rotation of the pivot arm is outside of an isosceles triangle whose base is formed by the longitudinal axes of the limbs of the U-shaped electric conductor before the pivoting begins, which leads to the deforming of the U-shaped electric conductor. This statement holds even if the height H of the triangle is much larger than the length $L_{BASE}$ of the triangle ($H>10\times L_{BASE}$).

According to an advantageous development of this method, it can be provided that the deforming section of the electric conductor, which comprises an area of the second limb and an adjoining area of the connection limb, is moved along a guide surface of the twisting guide element which has a first surface section which is proximate to the second limb and which the radius of the circular path on which the second limb is moved touches, and which has a second guide section which extends in the area of the connection limb and is located radially outside the circular path of the second limb.

This ensures that the deforming of the connection limb and the area of the second limb adjacent thereto is mechanically guided, i.e. not unguided, wherein as a result, the connection limb is deformed into a slightly S-shaped geometry, and in the process protrudes somewhat from the imaginary flat plane which the U-shaped electric conductor had before the beginning of the deforming process.

In order to further aid the deforming process, it can be provided that the first limb is clamped farther away from the connection limb by means of the first clamping device than is the case for the second limb by means of the second clamping device. As a result, the mechanically most heavily loaded connection area between the connection limb and the second limb is advantageously relieved during the deforming process because for this deforming process material of the first limb proximate to the connection limb is then also available.

Another development of the method according to the invention provides that the second limb is moved along a circular path whose axis of rotation is oriented parallel to the longitudinal alignment of the two mutually parallel limbs and disposed at a distance therefrom. This ensures that the free ends of the two mutually parallel limbs are not pivoted oppositely to each other with respect to the longitudinal alignment thereof even after the deforming process, but are aligned parallel to each other.

According to another advantageous variant of the method, a deforming section of the first limb proximate to the connection limb is bent in the direction of a clamping base of the first clamping device before the second limb is moved away from the first limb, wherein due to the integral nature of the electric conductor, the connection limb is carried along. This additional method step relieves the transition area between the first limb and the connection limb mechanically in the then subsequent deforming of the connection limb by means of the twisting guide element.

Furthermore, in order to prepare a concrete production process, the twisting guide element is radially shifted relative to the axis of rotation of the pivot arm and is turned about a pivot axis of the twisting guide element aligned parallel to the axis of rotation of the pivot arm before the production of a series of twisted, U-shaped electric conductors (i.e. the generic hairpins), said shifting and turning being such that a certain alignment of the two parallel limbs to each other and a certain deforming of the connection limb is achieved in the subsequent production process.

The deforming process may, according to one example, comprise at least the following process steps:

a) supplying a U-shaped electric conductor to a deforming device, wherein the electric conductor has two parallel limbs and a connection limb connecting them, all of which are disposed in an imaginary flat plane, b) clamping a clamping section of the first limb in a first clamping device and tightening a clamping section of the second limb in a second clamping device, wherein these two clamping sections are designed to be proximate to the connection limb, c) holding the two mutually parallel limbs at the respective clamping locations thereof and bending a deforming section of the first limb, which is designed to be proximate to the connection limb, away from the imaginary flat plane of the electric conductor, d) moving the second limb along a circular path whose center lies on the axis of rotation of the pivot arm, wherein this axis of rotation of the pivot arm is aligned parallel to the first limb of the electric conductor, and as a result of the movement of the second limb, stretching the connection limb of the electric conductor, e) moving a section of the connection limb along a guide surface of a twisting guide element, wherein at least a surface section of said guide surface is disposed radially outside the clamping location of the first limb relative to the axis of rotation of the pivot arm, f) and finally releasing the two clamping devices to release the electric conductor which has been transformed into a hairpin.

Preferably, thereafter, the hairpin is cut away from the rest of the wire, if it had not already been done before clamping the U-shaped wire.

To solve the device-related task, a device for deforming a U-shaped and cross-sectionally rectangular electric conductor is proposed into a generic hairpin used for the production of a bar winding of an electric machine, wherein the electric conductor has two parallel limbs, the limbs being integrally connected together by means of a connection limb.

This device comprises at least the following:
a device frame,
a first clamping device disposed on the device frame and fixed with respect to the device frame, by means of which the first limb can be clamped to the device frame,
a pivot arm rotatable about an axis of rotation, wherein this axis of rotation is aligned parallel to the first limb of the electric conductor,
a second clamping device disposed on the pivot arm, by means of which the second limb can be clamped to the pivot arm,
and a twisting guide element which is fixed to the device frame and has a guide surface at the end which is proximate to the second clamping device,
wherein said guide surface has a first surface section proximate to the second limb, the radius of a circular path meeting said surface, onto which the second limb is moved upon rotation of the pivot arm,
and wherein the guide surface has a second surface section proximate to the connection limb, the second surface being disposed radially outside the circular path of the second limb.

In this context, it should be noted that the device frame does not have to be stationary. Importantly, the first clamp is disposed on the device frame such that the first limb does not move relative to the device frame during the pivoting movement. The same applies to the twisting guide element, which is also attached to the device frame.

The second limb is clamped to the pivot arm so that it does not move relative to the pivot arm during the pivoting movement, but participates in the pivoting movement.

It is also possible that the device frame carries out the pivoting movement together with the twisting guide element and not the pivot arm (kinematic reversal). It is also possible that part of the pivoting movement is performed by the pivot arm and part of the pivotal movement is performed by the device frame and the twisting guide element. In all three alternatives, the first clamping device and the second clamping device make the same relative movement(s) during the pivoting operation, and the twisting guide element is disposed in a fixed relative position with respect to one of the two clamping devices, so that the hairpins, in accordance with the invention, are deformed from the U-shaped electric conductors.

The advantageous use of this deforming device has already been briefly described. A further description of the same is based on various embodiments.

According to a first development of this deforming device, it can be provided that the two clamping devices each have a first and a third adjusting device, the actuators of the devices being capable of pressing the first limb of the electric conductor directly or indirectly against a clamping base on the device frame or the second limb against a clamping base on the pivot arm. Said adjusting devices are preferably actuated by means of a secondary force, which can be generated electrically, hydraulically or pneumatically. Accordingly, the attachment of the two parallel limbs of the electric conductor can be done without human help, so that risks of injury are excluded and the manufacturing process is optimized.

In addition, it can be provided that in each case a second adjusting device is present on the first clamping device and/or on the second clamping device, by means of which the connecting section of the electric conductor after clamping the first limb and/or the second limb can be bent away out of the imaginary flat plane between the two parallel limbs, preferably in the direction of the device frame.

In a further development of said adjusting devices, it is preferably provided that the respective free end of the actuators of the adjusting devices of the two clamping devices each has a clamping piece, the pieces being designed for clamping abutment against the respective associated limb of the electric conductor, and that the clamping piece of the first clamping device has a heel at the device side facing the first limb such that when clamping the first limb to the associated clamping base, at the same time the deforming section of the first limb can be bent out from the imaginary flat plane between the two parallel limbs towards the device frame, carrying along the connecting section of the electric conductor.

In order to automate the deforming device also with respect to the movement of the pivot arm, it is preferably provided that the pivot arm is drivingly connected directly, or via at least one lever, to an actuator of a fourth adjusting device.

In addition, it is preferably provided that the twisting guide element is pivotable about a pivot axis and axially slidably mounted on the device frame with respect to the longitudinal direction of extension of the guide element.

For adjusting the radial disk position of the guide surface and the adjustment angle of the twisting guide element with respect to the connecting section of the electric conductor, it is preferable to provide that the twisting guide element is connected to an actuator of a fifth adjusting device for pivoting the twisting guide element about a pivot axis and/or sliding the same in the longitudinal direction of extension thereof.

It can further be provided that a pivotable adjusting disk is disposed on the device frame, the disk being used as a stop for the connecting section of the electric conductor when clamping the two mutually parallel limbs.

This adjusting disk is preferably connected to an actuator of a sixth adjusting device for pivoting the adjusting disk about a pivot axis such that the disk can be directly pivoted over the correct position of the connecting section of the electric conductor prior to the clamping thereof.

In addition, it is preferably provided that the axis of rotation of the pivot arm or its pivot bearing is disposed locally adjustably on the device frame. The adjustment range is defined by a coordinate system having two mutually perpendicular geometrical axes which are aligned perpendicular to the longitudinal axis of the fixedly clamped first limb of the U-shaped wire.

Finally, at least some of said adjusting devices are designed as electric stepper motors which are connected via control lines to a control device. Alternatively, it can be provided that at least some of said adjusting devices are designed as pressure-medium-operated actuators whose control valves are connected via control lines to a control device.

BRIEF DESCRIPTION OF THE DRAWINGS

The invention will be explained below with reference to several embodiments shown in the attached drawing. Shown in the drawing are.

DETAILED DESCRIPTION

Figure 1:
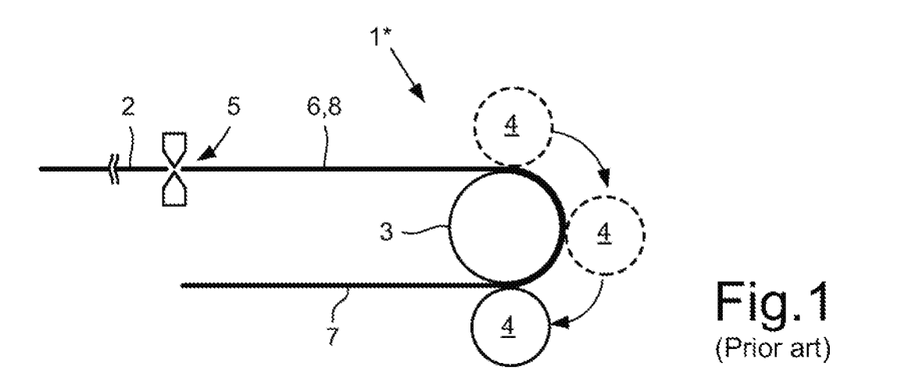
FIG. 1 a schematic representation of a known bending device for bending a U-shaped electric conductor from a wire, FIG. 2 a schematic representation of such an electric conductor with an imaginary flat plane between the limbs of the conductor, FIG. 3 the electric conductor according to FIG. 2 with a division of its functional sections, FIG. 4 a schematic view of a hairpin, which has been produced from an electric conductor according to FIGS. 2 and 3 according to a deforming process, and which is usable for producing a bar winding of an electrical machine, FIG. 5 a simplified schematic representation of a deforming device according to the invention in a starting position, by means of which a hairpin according to FIG. 4 can be produced from a U-shaped electric conductor according to FIG. 2 or 3.

Accordingly, FIG. 1 shows a schematic representation of a known bending device 1* for bending a U-shaped electric conductor 6 from a wire 2. For this purpose, the wire 2 is fed to a first roller 3 and bent around the surface of the first roller 3 in an arc-shape by means of a second roller 4. As soon as the two parallel limbs 7, 8 have a desired length, the wire 2 is severed by means of a cutting device 5 and the U-shaped electric conductor 6 is removed from the bending device 1* for further deforming.

In deviation from this prior art, the cutting of the wire 2 according to the invention preferably takes place only when the deforming process to be described below is completed. This approach has the advantage that the U-shaped bent wire 2 must be handled as a single part only after its final deforming.

Figure 2:
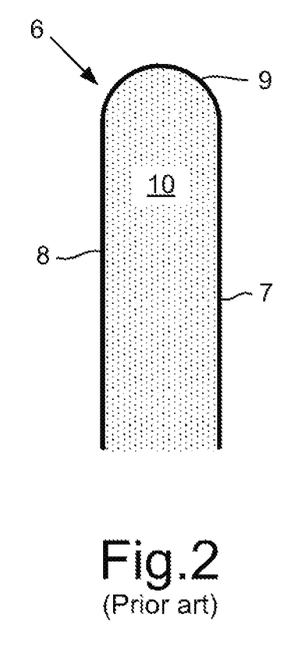

As FIG. 2 shows, the electric conductor 6 has a largely semicircular connection limb 9, which connects the two parallel limbs 7, 8 in one piece. The three limbs 7, 8, 9 of the electric conductor 6 are aligned with each other such that they span an imaginary, flat plane 10 between them. Such an electric conductor 6 serves as a precursor for producing a hairpin 19 shown in FIG. 4, whose limbs 7, 8, 9 no longer lie in the same imaginary plane 10. For this purpose, the electric conductor 6 must be deformed, wherein the deformation is carried out substantially in the area of the connection limb 9, so that the two other limbs 7, 8 still have a straight geometry, but are no longer disposed in the same, imaginary plane.

Figure 4:
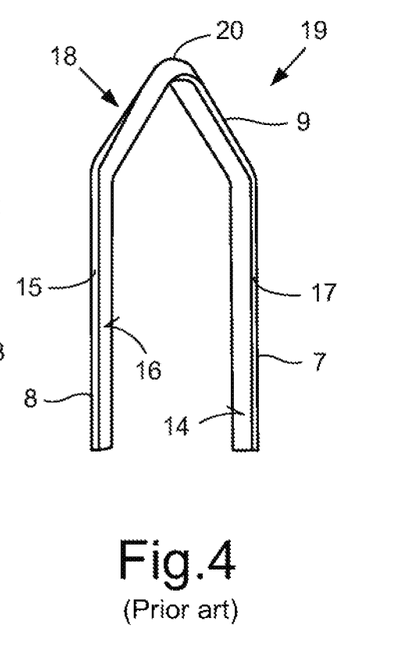

In order to use such an electric conductor 6 for producing a bar winding of a stator or armature of an electric machine with high electrical efficiency, the electric conductor 6 has a rectangular, preferably cuboid cross-sectional geometry. FIG. 4 shows such a hairpin 19 formed as an electric conductor 6, whose mutually parallel limbs 7, 8 each have a narrow longitudinal side 15, 17 and a wide longitudinal side 14, 16. In order to be able to use these two limbs 7, 8 in respectively assigned slots in a stator or armature core of an electric machine, the narrow longitudinal sides 17 and the wide longitudinal sides 14 of the first limb 7 face in directions that are different from the narrow longitudinal sides 15 and the wide longitudinal sides 16 of the second limb 8. In order to implement this alignment, the U-shaped electric conductor 6 is correspondingly deformed in a twisting area 18 of the connection limb 9. As a result, the connection limb 9, as shown in FIG. 4, can have a roof-like peak 20 or a flat curved geometry.

Figure 3:
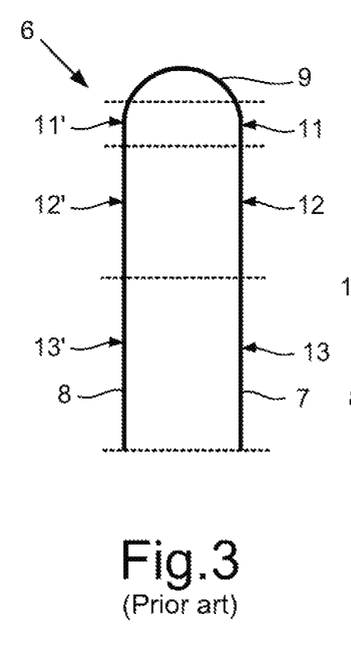

Before explaining which device and which method the invention proposes for producing a hairpin 19 from an electric conductor 6, useful functional sections of the electric conductor 6 are defined for the following description. As illustrated in FIG. 3, the electric conductor 6 has a first deforming section 11 and a second deforming section 11' in the connecting area of the connection limb 9, the sections also comprising a section of the two mutually parallel limbs 7, 8 which are proximate to the connection limbs. The two parallel limbs 7, 8 each have a clamping section 12, 12', which point to the free ends thereof and are provided for clamping in a deforming device 1 according to the invention. These are then followed by a respective lower section 13, 13', which extend to the respective free ends of the two parallel limbs 7, 8.

FIGS. 5 to 13 and 16 to 18 each show, viewed from different viewing directions and in different actuating positions, a deforming device 1 by means of which a U-shaped electric conductor 6 can be formed into a hairpin 19 which looks similar to that shown in FIG. 4.

Figure 16:
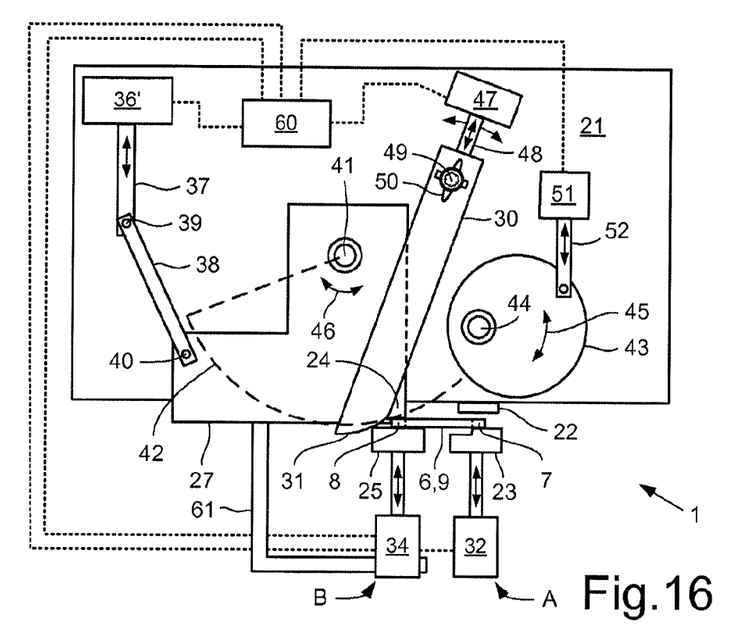
Figure 17:
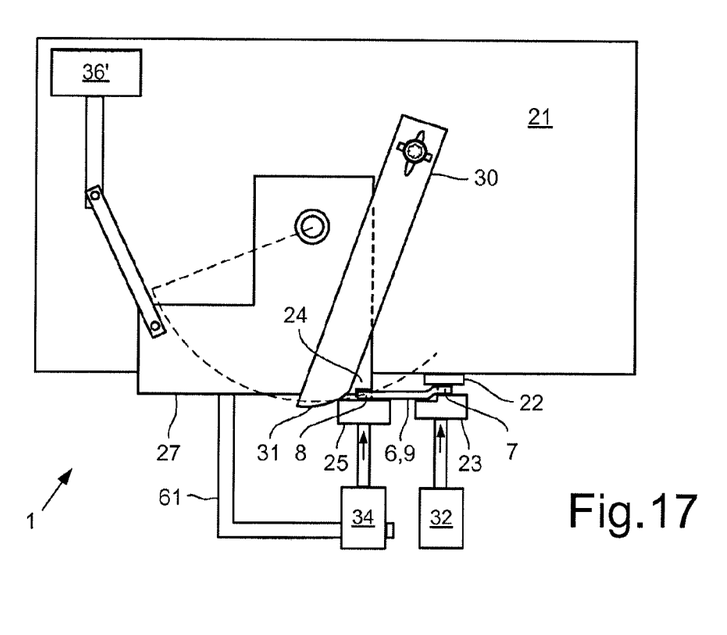
Figure 18:
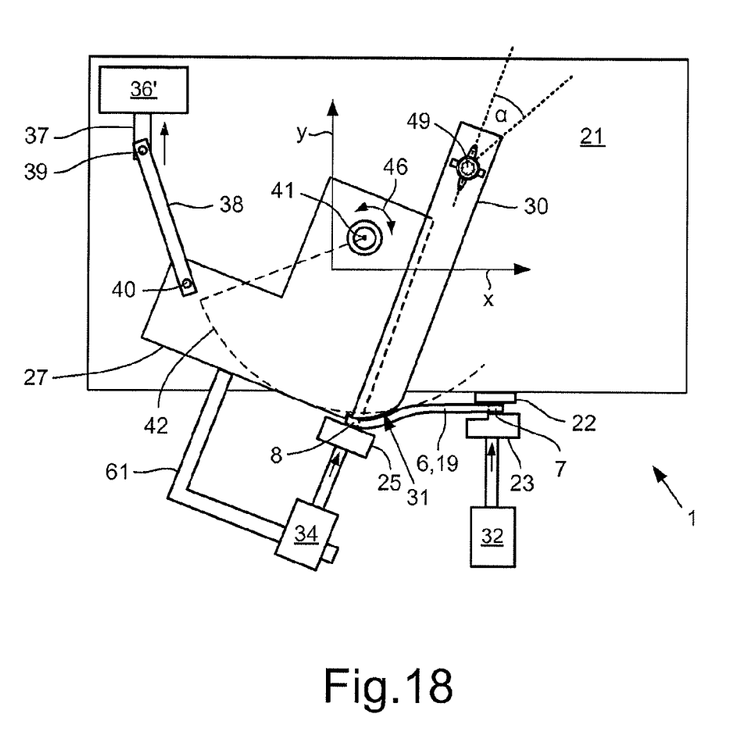

FIGS. 16 to 18 each best show the overall structure of the deforming device 1 in a schematic plan view. Accordingly, the deforming device 1 comprises a device frame 21, which holds all the essential components of the deforming device.

These include first of all two clamping devices A, B, by means of which in each case one of the two mutually parallel limbs 7, 8 of a U-shaped electric conductor 6 can be fixed at a corresponding associated first clamping base 22 and a second clamping base 24. The first clamping base 22 associated with the first clamping device A is fastened to the device frame 21 or integrally forms part of it, and serves as an abutment in clamping the first limb 7 of the U-shaped electric conductor 6. The clamping of this first limb 7 by a first clamping piece 23 which is formed or fixed to the free end of an actuator of a first adjusting device 32. This first adjusting device 32 is designed as an axial actuator. A second adjusting device 33, also designed as an axial actuator, which is shown only in FIG. 13 and described later, can likewise be disposed at the location of the second clamping device A.

The first adjusting device 32, as well as all other adjusting devices yet to be mentioned, are preferably designed as electromotive actuators. But they can also be hydraulic or pneumatic actuators. The respective final control element of the actuators can be moved axially or rotationally.

The second clamping device 24 assigned to the second clamping device B is a component of a pivot arm 27 which, according to FIGS. 16 to 18, is mounted pivotably about an axis of rotation 41 on the device frame 21. In the simplest case, this second clamping base 24 is formed as a recess on the pivot arm 27, which has a section of the cross-sectional geometry of the second parallel limb 8 of the electric conductor 6. The second clamping base 24 thus serves as an abutment when clamping the second limb 8 of the U-shaped electric conductor 6 on the pivot arm 27. The clamping of this second limb 8 is accomplished by means of a second clamping piece 25 which is formed or fixed to the free end of an actuator of a third adjusting device 34. This third adjusting device 34 is also designed as an axial actuator. The housing of this third adjusting device 34 is fixedly connected to the pivot arm 27 by way of a connecting structure 61, as shown schematically.

The pivot arm 27 is fastened to an actuator 37 of a fourth adjusting device 36' by way of a lever 38 and joints 39, 40, the adjusting device also being designed as an axial actuator. An actuation of the fourth adjusting device 36' leads to a pivoting movement of the pivot arm 27 about the axis of rotation 41 thereof according to the double arrow in FIG. 16 which indicates the direction of motion 46. Alternatively, it is possible, as shown in FIGS. 5 to 13, that the fourth adjusting device 36 is formed as a rotary actuator with an axis of rotation 28, and that the rotary actuator 36 forms the pivot bearing of the pivot arm 27.

In addition, a rod-shaped twisting guide element 30 is fixed to the device frame 21. In the illustrated embodiment, the attachment of this twisting guide element 30 is such that the twisting guide element 30 is axially displaceable both in the direction of the longitudinal extent thereof and is mounted pivotally about an adjusting axis 49 aligned perpendicular thereto (see local double arrows). An axial adjustment of the twisting guide element 30 is preferably carried out by means of at least a fifth adjusting device 47 which is formed as an axial actuator and is connected to the twisting guide element 30 by way of an actuator 48. In order to guide the axial adjustment of the twisting guide element 30, in the illustrated embodiment the element comprises a slot 50 which is penetrated by a screw which is screwed into the device frame 21. The reference character a in FIG. 18 indicates an adjustment angle according to which the twisting guide element 30 can be aligned. The adjustment angle α and the axial position of the axial end of the twisting guide element 30 effective for the deformation of the electric conductor 6 are dependent on the dimensions of the electric conductor to be deformed 6 and on the deforming geometry of the same to be achieved.

The twisting guide element 30 has, at the end thereof remote from the actuator, a guide surface 31 along which the second limb 8 and/or the connection limb 9 of the clamped electric conductor 6 can be closely guided, said conductor being deformed along the way. Such a deformation process takes place when the second limb 8 of the electric conductor 6 clamped by the second clamping device B is moved along a circular path 42 during a pivoting movement of the pivot arm 27, the path being at least partially radially within the range of the guide surface 31 of the twisting guide element 30. This will be discussed in more detail, but reference is made here to FIG. 18, which shows how, as a result of such a deforming operation, a hairpin 19 was formed from the U-shaped electric conductor 6, the hairpin able to be used for producing a bar winding of a stator or armature of an electric machine. The guide surface 31 is designed so that after completion of the deforming process, the hairpin has the desired form and the transitions between the various sections 12, 12', 11, 11' of the electric conductor 6 are as round as possible in order to minimize the local deformation of the wire and any existing protective lamination. The guide surface 31 is usually a free-form surface.

As shown in FIG. 16 only, the deforming device 1 can also have an adjusting disk 43 which is fastened to the device frame 21 and is pivotable about an eccentric pivot axis 44. The pivoting of the adjusting washer 43 is accomplished by means of a sixth adjusting device 51, which is also designed as an axial actuator and is connected to the radially outer edge of the adjusting disk 43 by way of an actuator 52 designed as a coupling bar. Upon extension of the actuator 52, the adjusting disk 43 is rotated far enough for the disk to cover the clamping location for the electric conductor 6 just above the connection limb 9. The local pivoting directions 45 there are illustrated by a double arrow. When manually or mechanically inserting the two parallel limbs 7, 8 into the associated clamping devices A, B, the peak 20 or curved top of the connection limb 9 is brought into contact with the bottom of the adjusting disk 43 so that the electric conductor 6 is properly positioned in the two clamping devices A, B before they are closed.

Finally, FIG. 16 shows that all adjusting devices 32, 33, 34, 36, 36', 47, 51 of the deforming device 1 are connected to a control device 60 by way of control lines which are depicted by dashed lines, the control device issuing commands for actuating these actuators. The decisions made by the control device 60 are preferably on the basis of sensor information received from sensors, which are not shown.

The described deforming device 1 can be operated by a method which has the features of the method-related claims. For this purpose, details will now be provided on FIGS. 5 to 15, which schematically illustrate a deforming device 1 which is substantially identical to the deforming device 1 shown in FIGS. 16 to 18. It is only the fourth adjusting device 36' actuating the pivot arm 21 which is shown in FIGS. 5 to 15 as a rotary actuator 36 in order to simplify the drawing, i.e. drawn as a servomotor, for example, but nothing is changed concerning the principle of operation of the device 1 nor concerning the process for deforming an electric conductor 6 according to the invention.

Figure 5:
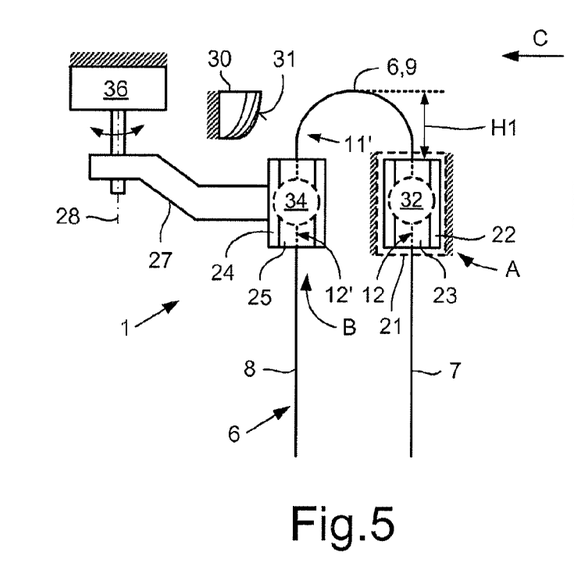
Figure 6:
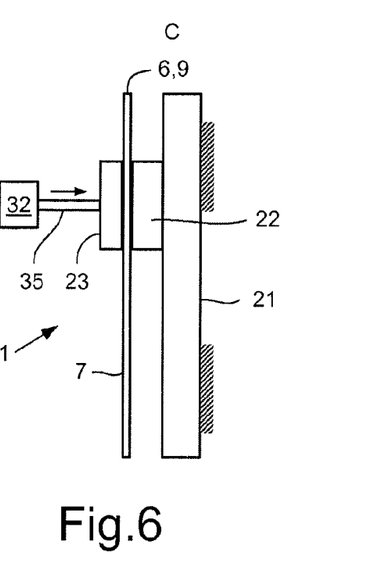
FIG. 6 shows the deforming device according to FIG. 5 in a schematic side view C in the starting position with a view of the fixedly disposed first limb of the electric conductor, FIG. 7 the deforming device according to FIG. 5 during a first contact of the second limb of the electric conductor with a twisting guide element, FIG. 8 the deforming device according to FIG. 7 at continued contact of the second limb of the electric conductor with the twisting guide element, FIG. 9 the deforming device according to FIG. 8 in a schematic side view with a view of the two limbs of the electric conductor, FIG. 10 the deforming device according to FIG. 5 with a stop for adjusting the clamping position of the electric conductor, FIG. 11 the deforming device according to FIG. 10 in a schematic side view with the stop, FIG. 12 the deforming device according to FIG. 5 with a pressure piece which can be adjusted by means of an actuator, the pressure piece acting on a deforming section of the first limb, FIG. 13 the deforming device according to FIG. 12 in a schematic side view, in which the actuator which acts on the pressure piece can also be seen, FIG. 14 a detailed view of the guide surface of the twisting guide element according to FIGS. 5 to 13, FIG. 15 a schematic side view of the first clamping device, which has a stepped clamping piece, FIG. 16 a deforming device having the features of the invention in a plan view, illustrated with an electric conductor clamped there, in a non-actuated position, FIG. 17 the deforming device according to FIG. 16 in a plan view after an initial deforming of the first limb of the electric conductor, FIG. 18 the deforming device according to FIG. 16 in a plan view after a final deforming of the electric conductor into a hairpin and FIG. 19 a reduced representation of FIG. 16 for explaining the relative position of the axis of rotation of the pivot arm relative to the limbs of the electric conductor.

FIGS. 5 and 6 show an initial situation in which a U-shaped electric conductor 6 is clamped by way of the two mutually parallel limbs 7, 8 thereof in a deforming device 1 designed according to the invention. For this purpose, the two clamping devices A, B engage the associated clamping sections 12, 12' of the limbs 7, 8, wherein the first adjusting device 32 and the third adjusting device 34 press, using respective clamping pieces 23, 25, the limbs 7, 8 to the associated first clamping base 22 and second clamping base 24, respectively. As the figures show, the two clamping devices A, B fix the electric conductor 6 below the connection limb 9 and below a deforming section 11, 11' of the respective parallel limbs 7, 8. This ensures that a subsequent deforming of the electric conductor 6 can take place not only in the connection limb 9 but also in the deforming sections 11, 11' proximate to the connection limb. In this initial situation, the unclamped section of the electric conductor 6 has a height H1 from the upper edge of the two clamping pieces 23, 25 to the upper edge of the connection limb 9.

In particular, FIG. 6 shows, in a side view C of the deforming device 1, that the first limb 7 is disposed between the first clamping base 22 and the first pressure piece 23 of the first adjusting device 32, and that the first adjusting device 32 designed as an axial actuator presses against the first limb 7 using actuator 35 according to the direction arrow shown there.

Figure 7:
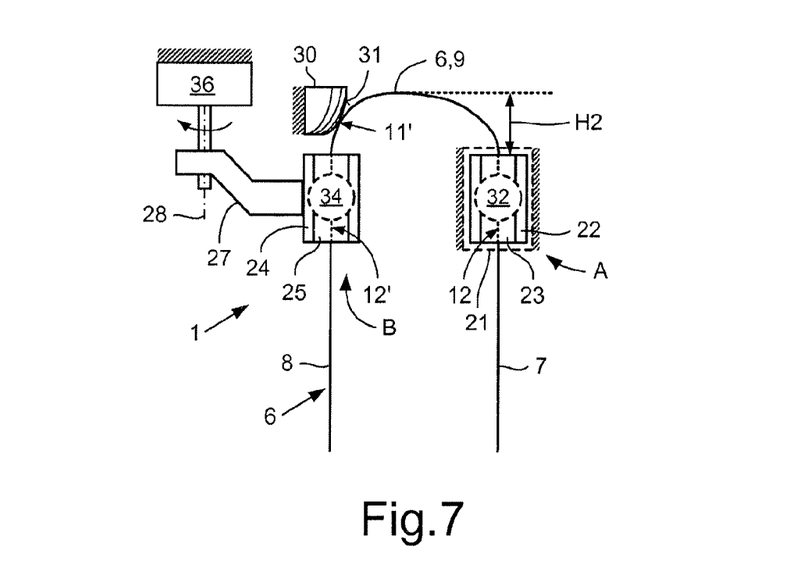

FIG. 7 shows a second operating situation of the deforming device 1, in which the pivot arm 27 has been pivoted about pivot axis 28 by means of the fourth adjusting device 36 far enough for the electric conductor 6 to just touch the guide surface 31 of the twisting guide element 30, which in this case projects out from the drawing plane. By this pivoting operation, the electric conductor 6 was stretched in the area of its connection limb 9, so that thereby the height H2 from the upper edge of the connection limb 9 to the upper edge of the two clamping pieces 23, 25 has decreased. The stretching of the connection limb 9 and optionally of the adjacent sections of the two limbs 7, 8 in this case led to no structural change in the material of the electric conductor 6, but only to a change in geometry in said connection limb section of the electric conductor 6.

Figure 8:
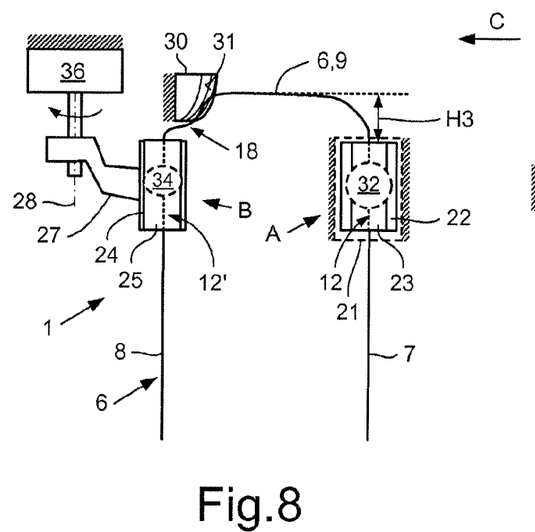
Figure 9:
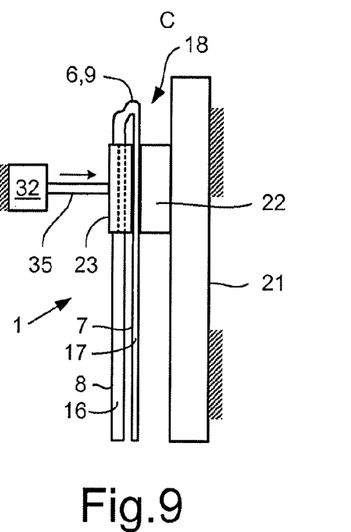
Figure 10:
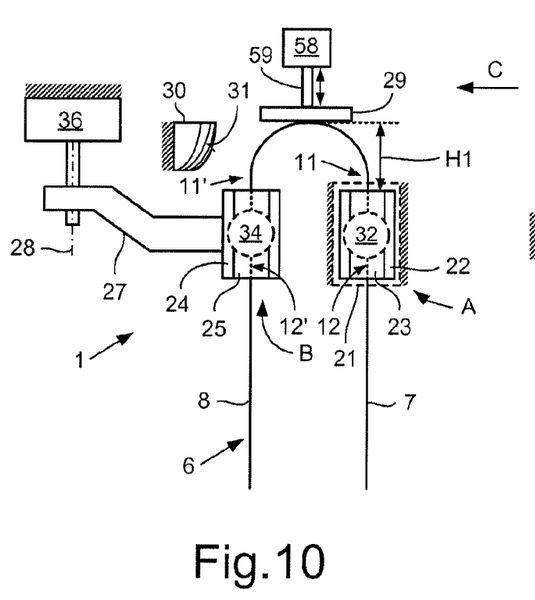
Figure 11:
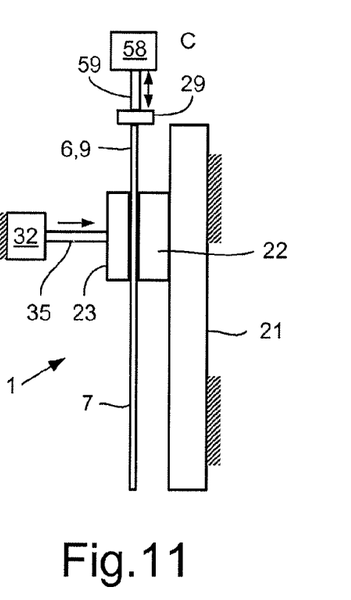

FIGS. 8 and 9 show the deforming device 1 according to the invention in an operating situation in which the desired deforming of the electric conductor 6 is completed and this now has the geometry of a generic hairpin 19. For this purpose, in a circular movement of the clamping position of the second limb 8, which is fixed to pivot arm 27, the limb is guided along the mentioned circular path 42 and thereby the deforming section 11' of the second limb 8 and the connection limb 9 moves along the guide surface 31 of the twisting guide element 30, with a concomitant pressing force resulting from the rotational movement of the pivot arm 27 and the geometric conditions. Meanwhile, the first limb 7 remains firmly clamped and fixed to the device frame 21. The guide surface 31 of the twisting guide element 30 is designed and positioned with respect to the circular path 42 of the first limb 7 such that the electric conductor 6 is bent radially outward after first contact is made with the twisting guide element 30 on the guide surface 31 as shown in FIG. 7, followed by deflection of the second deforming section 11' relative to the circular path 42. This gives the second deforming section 11' of the electric conductor 6 the geometry of a generic hairpin 19, which is suitable for producing a bar winding of a stator or armature of an electric machine.

The geometry of the hairpin 19 depends, among other things, on the size of the radius of the circular path 42 along which the second limb 8 is moved during a pivoting movement of the pivot arm 27. In addition, the geometry of the hairpin 19 to be produced depends on the adjustment angle α of the twisting guide element 30 relative to the connection limb 9. In addition, the geometry of the hairpin 19 to be produced is determined by the extent to which the guide surface 31 of the twisting guide element 30 extends radially inside and outside of said circular path 42 of the second limb 8.

Figure 14:
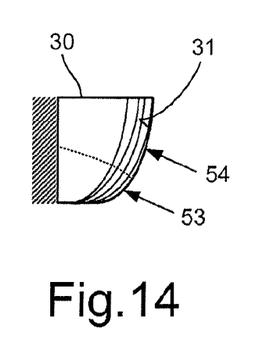

According to the exemplary embodiment illustrated in FIG. 14, it can therefore be provided that the guide surface 31 of the twisting guide element 30 has a first surface section 53 proximate to the second limb 8 of the electric conductor 6, said first surface section being disposed radially inside the circular path 42 of the second limb 8, and that the guide surface 31 has a second surface section 54 proximate to the connection limb 9, said second surface section being disposed radially outside the circular path 42 of the second limb 8.

Finally, three further developments of the deforming device 1 according to the invention will be described. According to FIGS. 10 and 11, instead of the adjusting disk 43 shown in FIG. 16, the deforming device 1 can have a stop 29 at which the upper end of a U-shaped electric conductor 6 formed by the connection limb 9 can abut in order to set the clamping position thereof. In the example shown in FIGS. 10 and 11, this stop 29 is formed by the free end of the actuator 59 of a seventh adjusting device 58, which is also designed here as an axial actuator whose rod-shaped actuator 59 can be shifted toward the upper end (peak 20) of the connection limb 9.

Figure 12:
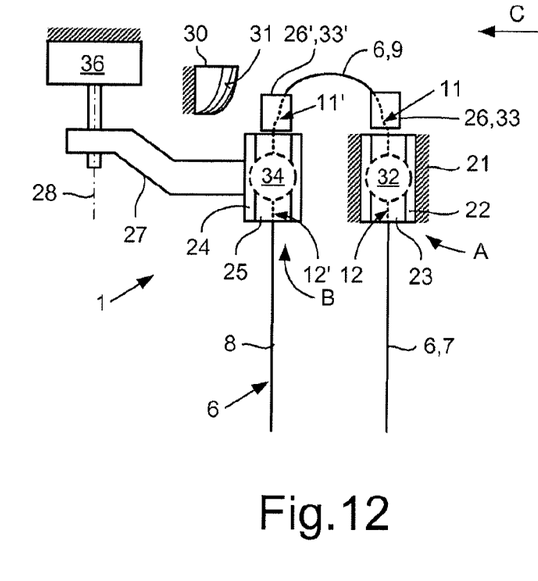
Figure 13:
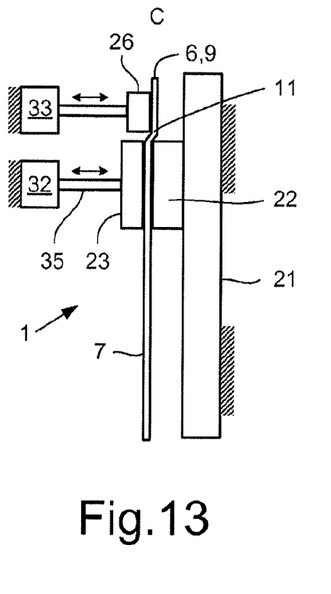

FIGS. 12 and 13 show a variant already indicated further above, in which a total of two adjusting devices 32, 33 designed as axial actuators are disposed in the area of the first clamping device A. By means of the first adjusting device 32, as already described, the first limb 7 of the electric conductor 6 is fixed in place on the device frame 21. After this is done, the deforming section 11 of the first limb 7 and the section of the connection limb 9 adjacent thereto can be bent somewhat in the direction of the device frame 21 by means of the second adjusting device 33. In the example shown in FIG. 13, a pressure piece 26 of the second adjusting device 33 presses against the deforming section 11 of the first limb 7 which is formed proximate to the connection limb 9. By such a first deforming of the electric conductor 6, the later deforming process at the guide surface 31 of the twisting guide element 30 can be improved.

FIG. 12 shows that a second adjusting device 33' can also be disposed in the area of the third adjusting device 34, the second device being able to press against the deforming section 11' of the second limb 8 and the section of the connection limb 9 adjacent thereto using a pressure piece 26' in order to bend this area slightly towards the device frame 21.

Figure 15:
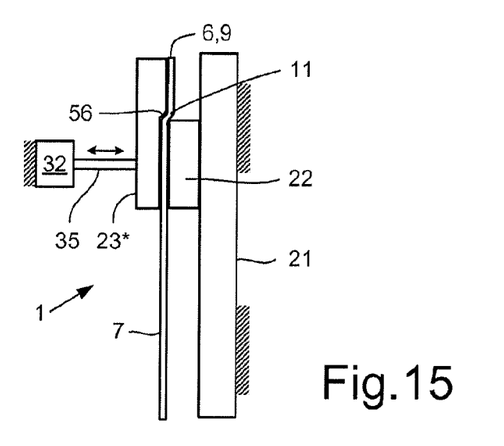

FIG. 15 shows that a similar deforming process can also be carried out with the first adjusting device 32 if the clamping piece 23* thereof has a step 56 in the direction of the electric conductor 6.

In addition, FIG. 18 shows that the axis of rotation 41 of the pivot arm 27 or the pivot bearing thereof can be disposed at different locations of the device frame 21. These different positions are located in a coordinate system which is defined by two geometrically aligned axes x, y. The two axes x, y are aligned perpendicular to the longitudinal axis of the first limb 7 of the U-shaped wire 6, and in the embodiment shown in FIG. 18 the second axis y extends parallel to the actuator of the first adjusting device 32. The shift in the location of the axis of rotation 41 of the pivot arm 27 or the pivot bearing thereof on the device frame 21 is preferably carried out by means of at least one further actuating drive, not shown here, for example actuated by a fluid pressure medium or electrically.

Due to the adjustability of the location of the axis of rotation 41 of the pivot arm 27 or the pivot bearing thereof on the device frame 21 as described, the device 1 can easily be set up to deform differently-sized U-shaped wires 6 into hairpins with different connection limb 9 radii and different twisting characteristics.

Figure 19:
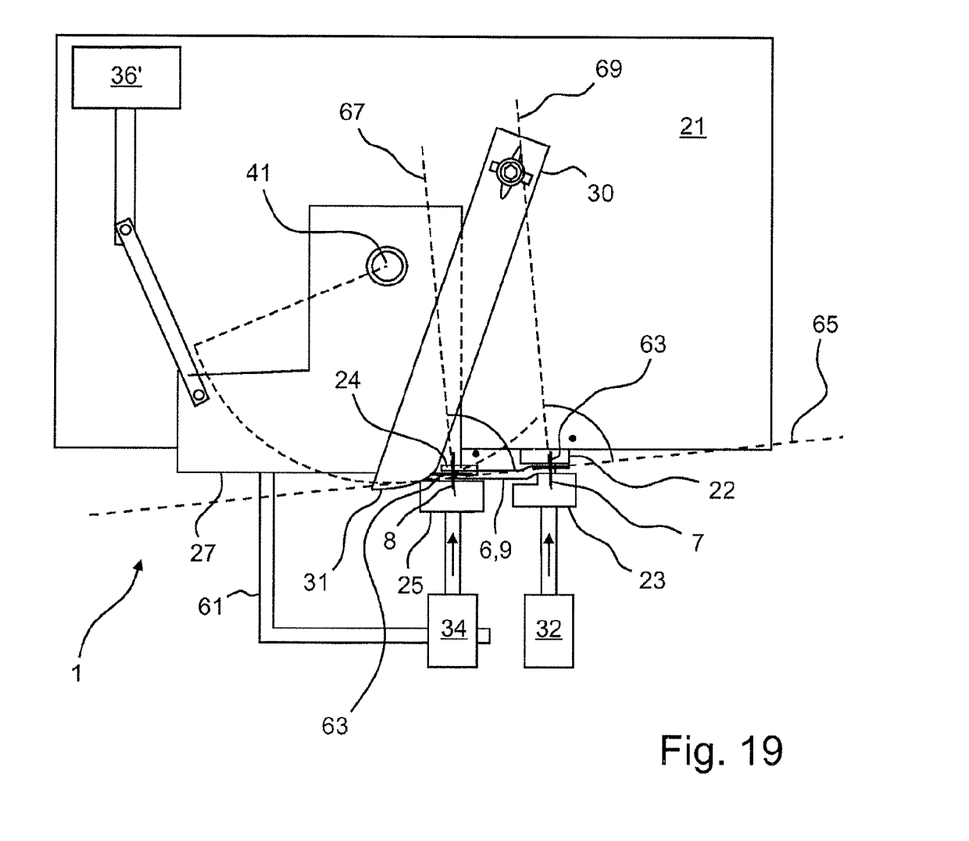

The position of the axis of rotation 41 of the pivot arm 27 relative to the position of the longitudinal axes of the limbs 8 and 9 of the electric conductor 6 is explained in more detail in FIG. 19.

FIG. 19 is based on FIG. 17, in which the limbs 7, 8 of the electric conductor are already clamped to the first clamping base 22 and the second clamping base 24. In FIG. 19, the longitudinal axes of the limbs 7, 8 are indicated by crosses 63. If now a connecting line 65 is drawn through the two longitudinal axes or crosses 63 and a straight line 67, 69 is drawn at both crosses 63 which includes an angle of 90° with the connecting line 65, then these mutually parallel straight lines 67, 69 define a surface (no reference sign). In most embodiments of the bending device 1 according to the invention, the axis of rotation 41 or 28 of the pivot arm 27 is outside of this area before the beginning of the pivoting movement. In FIG. 19, the pivot point 41 lies to the left of the area bounded by the straight lines 67, 69.

When the pivoting movement according to the invention is carried out, the distance between the longitudinal axes of the limbs 7, 8 increases because limb 8 moves along the circular path 42 in the clockwise direction. As a result, the area between the straight lines 67, 69 becomes wider (and changes direction). After the end of the pivoting movement, the pivot point 41 can lie within the area, which has become wider. This results when the crosses 63 are drawn into FIG. 18.

One can also express the same facts as follows: If one draws an isosceles triangle starting from the situation shown in FIG. 19, with the crosses 63 representing the base of this triangle, then the axis of rotation 41 of the pivot arm 27 lies outside this triangle, irrespective of how high the isosceles triangle is.

LIST OF REFERENCE SIGNS

1 Device for producing a U-shaped el. conductor
1\* Bending device
2 Wire
3 First roll (larger diameter)
4 Second roll (smaller diameter)
5 Cutting device
6 Electric conductor, U-shaped bent wire
7 First limb of the electric conductor
8 Second limb of the electric conductor
9 Connection limb of the electric conductor
10 Plane between the limbs of the electric conductor
11 First deforming section
11' Second deforming section
12 Clamping section of the first limb
12' Clamping section of the second limb
13 Lower section of the first limb
13' Lower section of the second limb
14 Wide longitudinal side of the first limb
15 Narrow longitudinal side of the first limb
16 Wide longitudinal side of the second limb
17 Narrow longitudinal side of the second limb
18 Finished twisting section
19 Deformed electric conductor, hairpin
20 Peak of finished hairpin 19
21 Device frame
22 First clamp base
23 First clamping piece
23\* Stepped pressure piece
24 Second clamp base
25 Second clamping piece
26, 26' Pressure piece
27 Pivot arm
28 Axis of rotation of the fourth adjusting device 36 designed as a rotary actuator
29 Stop
30 Twisting guide element
31 Guide surface of the twisting guide element
32 First adjusting device (at the first clamping device A)
33 Second adjusting device (at the first clamping device A)
33' Second adjusting device (at the second clamping device B)
34 Third adjusting device (at the second clamping device B)
35 Actuator at the first adjusting device 32
36 Fourth adjusting device (for the pivot arm); rotary actuator
36' Fourth adjusting device (for the pivot arm); axial actuator
37 Actuator of the fourth adjusting device 36'
38 Lever
39 Joint on the lever
40 Joint on the pivot arm
41 Axis of rotation of the pivot arm 27, pivot bearing
42 Circular path of the second limb 8
43 Adjusting disk
44 Pivot axis of the adjusting disk
45 Pivot direction of the adjusting disk 43
46 Pivot direction of the pivot arm 27
47 Fifth adjusting device
48 Actuator of the fifth adjusting device 47
49 Adjusting axis of the twisting guide element
50 Slot in the twisting guide element 30
51 Sixth adjusting device (for the adjusting disk)
52 Actuator of the sixth adjusting device
53 First surface section of the guide surface 31
54 Second surface section of the guide surface 31
56 Heel on the clamping piece 23\*
58 Seventh adjusting device (for stop 29)
59 Actuator of the seventh adjusting device
60 Control device
61 Connection structure
63 Cross (longitudinal axis of the limbs 7, 8 in plan view)
65 Connecting line between the longitudinal axes of the limbs
67, 69 parallel lines
α Adjustment angle of the pivot arm 27
A First clamping device
B Second clamping device
C Viewing direction of the first clamping device A
X First adjustment direction of the axis of rotation 41
Y Second adjustment direction of the axis of rotation 41

The invention claimed is:

1. A method executed using a device that deforms a U-shaped electric conductor into a hairpin which is used for producing a bar winding of an electrical machine, wherein, before deforming, the U-shaped electric conductor has two mutually parallel limbs, the limbs being integrally connected to one another by means of a connection limb and the three limbs being located in an imaginary flat plane, wherein the device comprises a device frame; a first clamping device (A) disposed on the device frame, by means of which the first limb is clamped to the device frame; a pivot arm which rotates about an axis of rotation, wherein this axis of rotation is aligned parallel to the first limb of the electric conductor; a second clamping device (B) disposed on the pivot arm, by means of which the second limb is clamped on the pivot arm; and a twisting guide element which is fixed to the device frame and which has a guide surface at the end which is proximate to the second clamping device (B), the method comprising steps of:
- (a) clamping the first limb in the first clamping device (A) by applying a force directly to the first limb and clamping the second limb in the second clamping device (B) by applying a force directly to the second limb, and
- (b) pivoting the second clamping device (B) along a circular path relative to the first clamping device (A) so that the second limb moves away from the first limb and the connection limb is stretched, and that in the deforming process, a deforming section which comprises an area of the connection limb of the electric conductor is deformed by a guide surface of a twisting guide element, wherein the method further comprising the step of moving the deforming section of the electric conductor, which comprises an area of the second limb and an area of the connection limb adjacent thereto, along a guide surface of the twisting guide element, the guide surface having a first surface section which is proximate to the second limb and having a circular path along which the second limb moves by touching, and which has a second surface section extending into the area of the connection limb and located radially outside the circular path of the second limb.

2. The method according to claim 1, comprising the further step of clamping the first limb farther away from the connection limb by means of the first clamping device (A) than clamping the second limb by means of the second clamping device (B).

3. The method according to claim 1, comprising the further step of moving the second limb along a circular path whose axis of rotation is oriented parallel to the longitudinal alignment of the two mutually parallel limbs and spaced therefrom.

4. The method according to claim 1, characterized in that prior to moving the second limb away from the first limb, a deforming section of the first limb which is proximate to the connection limb is bent towards a clamping base of the first clamping device (A).

5. The method according to claim 1, characterized in that prior to deforming U-shaped electric conductors into hairpins, the twisting guide element is shifted radially relative to the axis of rotation of the pivot arm and is pivoted about a pivot axis of the twisting guide element which is aligned parallel to the axis of rotation of the pivot arm.

6. The method according to claim 1, characterized in that between steps a) and b), the two mutually parallel limbs are held at their respective clamping locations and a deforming section of the first limb which is proximate to the connection limb is bent away from the imaginary flat plane of the electric conductor.

7. A device for deforming a U-shaped electric conductor into a hairpin which is used for producing a bar winding of an electrical machine, wherein the U-shaped electric conductor has two mutually parallel limbs which are integrally connected to each other by means of a connection limb, comprising:
- a device frame,
- a first clamping device (A) disposed on the device frame, by means of which the first limb is clamped to the device frame, wherein the first clamping device (A) is designed to apply a force to at least two opposite sides of the first limb directly,
- a pivot arm which rotates about an axis of rotation, wherein this axis of rotation is aligned parallel to the first limb of the electric conductor,
- a second clamping device (B) disposed on the pivot arm, by means of which the second limb is clamped on the pivot arm, wherein the second clamping device (B) is designed to apply a force to at least two opposite sides of the second limb directly, and
- a twisting guide element which is fixed to the device frame, and which has a guide surface at the end which is proximate to the second clamping device (B),
wherein the guide surface has a first surface section proximate to the second limb, having a circular path touching said first surface section, the second limb moving along said circular path during deforming when rotating the pivot arm or when moving the second clamping device (B),
and that the guide surface has a second surface section proximate to the connection limb, the second surface section being disposed radially outside the circular path of the second limb.

8. The device according to claim 7, characterized in that the first clamping device (A) has a first adjusting device and the second clamping device (B) has a third adjusting device, actuators of which press the first limb of the electric conductor directly or indirectly against a first clamping base or the second limb against a second clamping base.

9. The device according to claim 8, characterized in that the first clamping base is disposed on the device frame and the second clamping base is disposed on the pivot arm.

10. The device according to claim 7, characterized in that a second adjusting device is present on the first clamping device (A) or on the second clamping device (B), respectively, said second adjusting device able to bend the connection limb of the electric conductor away from the imaginary flat plane between the two parallel limbs after clamping the first limb or the second limb.

11. The device according to claim 10, characterized in that respective free ends of the actuators of the first, second and/or third adjusting devices of the two clamping devices (A, B) each has a clamping piece which is adapted for clamping abutment against the respective associated limbs of the electric conductor, and that the clamping piece of the first clamping device (A) has a heel at the device side facing the first limb such that when clamping the first limb at the associated clamping base at the same time a deforming section of the first limb can be bent out from the imaginary flat plane between the two parallel limbs toward the device frame, carrying along the connection limb of the electric conductor.

12. The device according to claim 7, characterized in that the pivot arm is drivingly connected directly or by way of at least one lever with an actuator of a fourth adjusting device.

13. The device according to claim 7, characterized in that the twisting guide element can be pivoted about a pivot axis and is mounted on the device frame axially-movably with respect to longitudinal direction of extension thereof.

14. The device according to claim 13, characterized in that the twisting guide element is connected to an actuator of a fifth adjusting device, the actuator able to pivot the twisting guide element about the pivot axis and/or to shift said element axially with respect to the longitudinal direction thereof.

15. The device according to claim 7, characterized in that a pivotable adjusting disk or a stop is disposed on the device frame, said disk or stop acting as a stop for the connection limb during clamping of the two mutually parallel limbs of the electric conductor.

16. The device according to claim 15, characterized in that the adjusting disk is connected to an actuator of a sixth adjusting device, the actuator is able to pivot the adjusting disk about a pivot axis such that the disk is pivoted directly over the correct position of the connection limb of the electric conductor before clamping thereof.

17. The device according to claim 7, characterized in that in alignment with the axis of rotation of the pivot arm, a locally adjustable pivot bearing thereof is disposed on the device frame.

18. The device according to claim 10, characterized in that at least some of first, second and/or third adjusting devices are designed as electric stepper motors which are connected to a control device by way of control lines.

19. The device according to claim 8, characterized in that at least some of said adjusting devices are designed as pressure medium-operated actuators whose control valves are connected to a control device by way of control lines.

* * * * *